(12) United States Patent
Suess et al.

(10) Patent No.: US 11,729,534 B1
(45) Date of Patent: Aug. 15, 2023

(54) LOW POWER EVENT DRIVEN PIXELS WITH PASSIVE DIFFERENCE DETECTION CIRCUITRY, AND RESET CONTROL CIRCUITS FOR THE SAME

(71) Applicant: OMNIVISION TECHNOLOGIES, INC., Santa Clara, CA (US)

(72) Inventors: Andreas Suess, San Jose, CA (US); Shoushun Chen, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/875,240

(22) Filed: Jul. 27, 2022

(51) Int. Cl.
| | |
|---|---|
| *H04N 25/772* | (2023.01) |
| *H04N 25/42* | (2023.01) |
| *H04N 25/50* | (2023.01) |
| *H04N 25/709* | (2023.01) |
| *H03K 19/00* | (2006.01) |

(Continued)

(52) U.S. Cl.
CPC .......... *H04N 25/772* (2023.01); *H04N 25/42* (2023.01); *H04N 25/50* (2023.01); *H04N 25/709* (2023.01)

(58) Field of Classification Search
CPC .... H04N 25/772; H04N 25/709; H04N 25/42; H04N 25/50; H04N 25/58; H04N 25/587; H04N 25/62; H04N 25/74; H04N 25/778; H04N 25/779; H04N 25/47; H04N 25/702; H04N 25/703; H04N 25/707; H03K 19/00; H03K 19/20; H03M 1/403; H03M 1/442; H03M 1/446
See application file for complete search history.

(56) References Cited

U.S. PATENT DOCUMENTS

| | | | | |
|---|---|---|---|---|
| 6,476,864 B1 * | 11/2002 | Borg | ................. | H01L 27/14609 348/245 |
| 7,719,583 B1 * | 5/2010 | Lee | ........................ | H04N 25/65 348/294 |

(Continued)

OTHER PUBLICATIONS

L. Wu et al., "In-Pixel Storage Techniques for CMOS Burst-Mode Ultra-High-Speed Imagers," Vrije Universiteit Brussel (VUB), Dept. of Electronics and Informatics (ETRO), Brussels, Belgium, pp. 312-312.

(Continued)

*Primary Examiner* — Marly S Camargo
(74) *Attorney, Agent, or Firm* — Perkins Coie LLP

(57) ABSTRACT

Low power event driven pixels with passive difference detection circuit (and reset control circuits for the same) are disclosed herein. In one embodiment, an event driven pixel comprises a photosensor; a photocurrent-to-voltage converter, and a difference circuit. The difference circuit includes a source follower transistor and a switched-capacitor filter having an input coupled to the photocurrent-to-voltage converter and an output coupled to a gate of the source follower transistor. The switched-capacitor filter includes a first capacitor coupled between the input and the output of the switched-capacitor filter, a second capacitor having a first plate coupled to the output of the switched-capacitor filter, and a reset transistor coupled between a reference voltage and the output of the switched-capacitor filter. The difference circuit is configured generate a difference signal that is indicative of whether the event driven pixel has detected an event in an external scene.

30 Claims, 5 Drawing Sheets

(51) Int. Cl.
*H03K 19/20* (2006.01)
*H03M 1/40* (2006.01)
*H03M 1/44* (2006.01)

(56) References Cited

U.S. PATENT DOCUMENTS

| | | | |
|---|---|---|---|
| 8,610,615 B2 * | 12/2013 | Kawahito | H03M 1/38 |
| | | | 341/161 |
| 8,780,240 B2 | 7/2014 | Posch et al. | |
| 9,961,291 B2 | 5/2018 | Chen | |
| 11,212,457 B2 | 12/2021 | Dai et al. | |
| 11,240,454 B2 | 2/2022 | Gao et al. | |
| 11,430,828 B2 | 8/2022 | Gao et al. | |
| 2017/0353683 A1 * | 12/2017 | Sakakibara | H04N 25/76 |
| 2021/0344867 A1 * | 11/2021 | Gao | H04N 25/778 |
| 2022/0149864 A1 * | 5/2022 | Pradash | H03M 3/32 |
| 2022/0201236 A1 | 6/2022 | Gao et al. | |
| 2022/0239855 A1 * | 7/2022 | Spiessens | H04N 25/75 |
| 2022/0239858 A1 | 7/2022 | Dai et al. | |
| 2022/0321811 A1 * | 10/2022 | Myers | H04N 25/778 |

OTHER PUBLICATIONS

L. Wu et al., "Analysis and Design of a CMOS Ultra-High-Speed Burst Mode Imager with In-Situ Storage Topology Featuring In-Pixel CDS Amplification," Department of Electronics and informatics (ETRO), Vrije Universiteit Brussel, 1050 Brussels, Belgium, Sep. 23, 2018, 17 pages.

S. Ranganathan et al., "Discrete-Time Parametric Amplification Based on a Three-Terminal MOS Varactor: Analysis and Experimental Results," IEEE Journal of Solid-State Circuits, vol. 38, No. 12, Dec. 2003, 7 pages.

A. Suess et al., U.S. Appl. No. 17/875,244, filed Jul. 27, 2022, 41 pages.

A. Suess et al., U.S. Appl. No. 17/815,526, filed Jul. 27, 2022, 47 pages.

Wu et al., "In-Pixel Storage Techniques for CMOS Burst-Mode Ultra-High-Speed Imagers," Vrije Universiteit Brussel (VUB), Dept. of Electronics and Informatics (ETRO), Brussels, Belgium, 2017, p. 312-315.

* cited by examiner

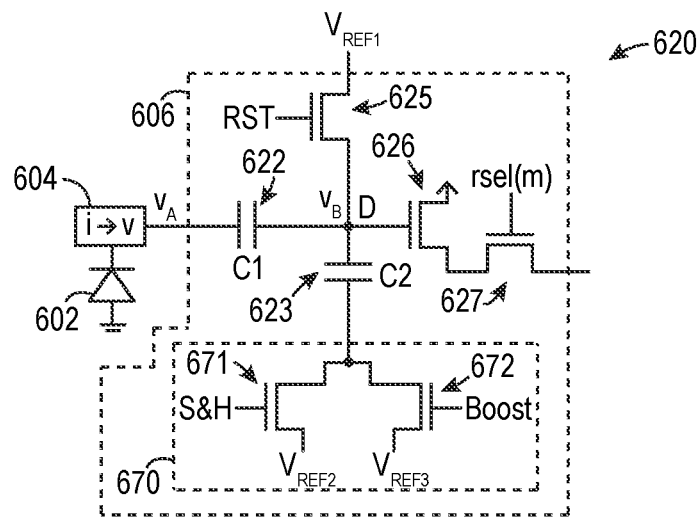
FIG. 6
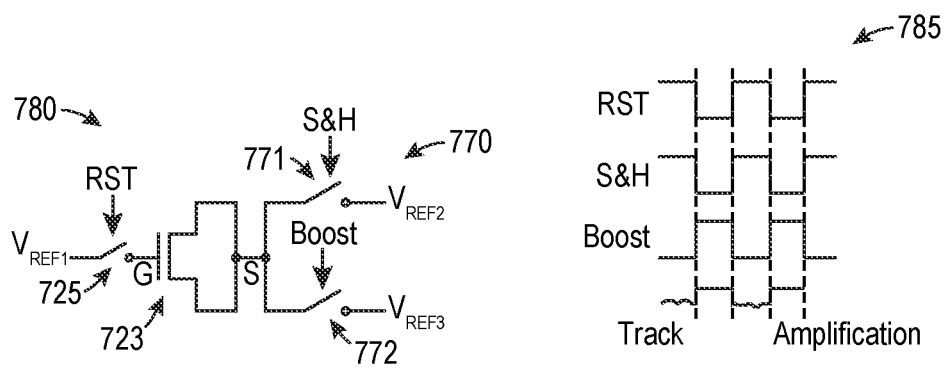
FIG. 7A     FIG. 7B
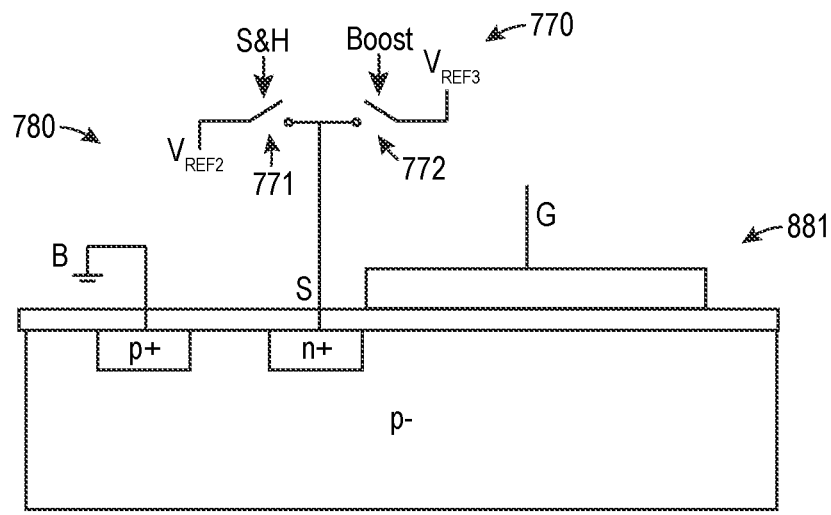
FIG. 8

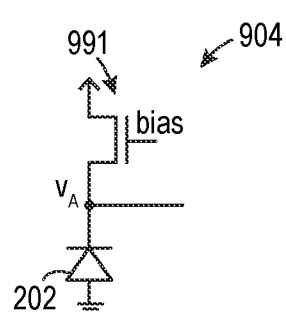
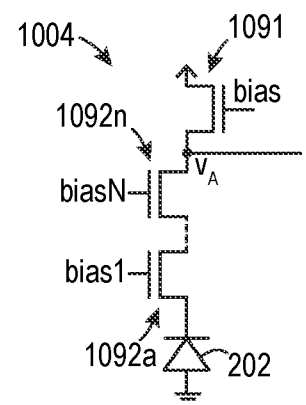
FIG. 9               FIG. 10
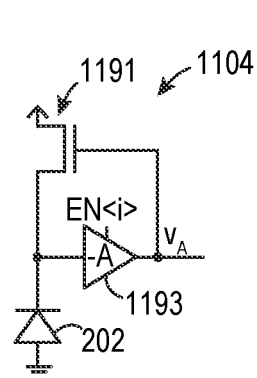
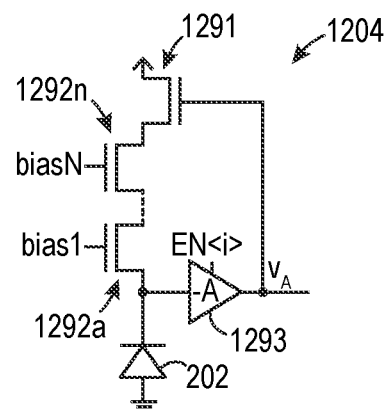
FIG. 11              FIG. 12

US 11,729,534 B1

LOW POWER EVENT DRIVEN PIXELS WITH PASSIVE DIFFERENCE DETECTION CIRCUITRY, AND RESET CONTROL CIRCUITS FOR THE SAME

TECHNICAL FIELD

This disclosure relates generally to image sensors. For example, several embodiments of the present technology relate to event driven pixels, including low power event driven pixels with passive difference detection circuitry, and reset control circuits for the same.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

FIG. 6 is a partial schematic diagram of another event driven pixel configured in accordance with various embodiments of the present technology.

FIG. 7A is a partial schematic diagram of a MOS varactor circuit configured in accordance with various embodiments of the present technology.

FIG. 7B is a timing diagram illustrating a method of operating the MOS varactor circuit of FIG. 7A in accordance with various embodiments of the present technology.

FIG. 8 is a partial schematic diagram of a three-terminal device that can be used in the of the MOS varactor circuit of FIG. 7A.

FIGS. 9-12 are partial schematic diagrams of photocurrent-to-voltage converters coupled to photosensors, each configured in accordance with various embodiments of the present technology.

Figure 1:
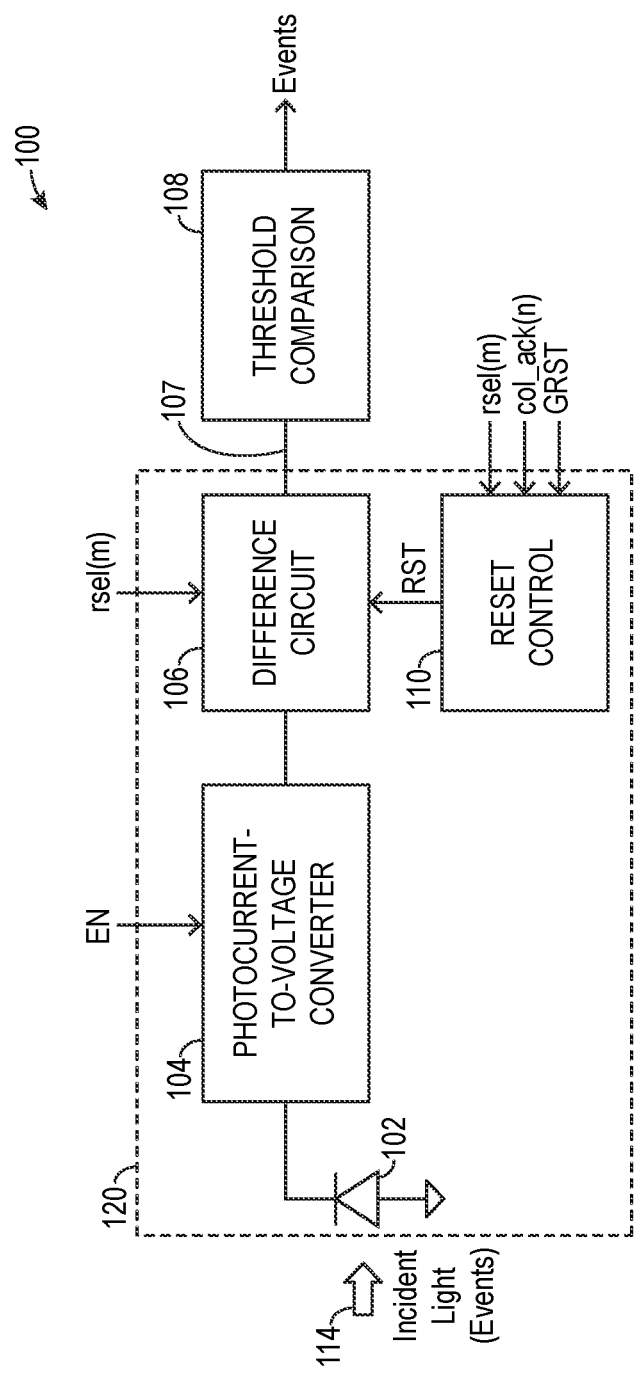
FIGS. 1 and 2 are partial schematic block diagrams of imaging systems including event driven pixels, each configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

The present disclosure relates to event driven sensors. For example, several embodiments of the present technology are directed to event driven pixels, including low power event driven pixels with passive difference detection circuitry and/or to event driven pixels with reset control circuits. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) that illustrated in the figures, and the spatially relative descriptors used herein are interpreted accordingly. In addition, it will also be understood that when an element is referred to as being "between"

two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. OVERVIEW

An active pixel sensor commonly employs an array of pixels having an integration time that is globally defined. Thus, pixels in an array of an active pixel sensor typically have an identical integration time, and each pixel in the array is typically converted into a digital signal regardless of its content (e.g., regardless of whether there has been a change in an external scene that was captured by a pixel since the last time the pixel was read out).

In comparison, event driven sensors (e.g., event vision sensors or dynamic vision sensors) read out a pixel and/or convert a corresponding pixel signal into a digital signal only when the pixel captures a change (e.g., an event) in the external scene. In other words, pixels of an event driven sensor that do not detect a change in the external scene are not read out and/or pixel signals corresponding to such pixels are not converted into digital signals. Thus, each pixel of an event driven sensor can be independent from other pixels of the event driven sensor, and only pixels that detect a change in the external scene need be read out, and/or have their corresponding pixel signals converted into digital signals and/or recorded (thereby saving power).

Many event driven pixels include local amplification and comparators for event threshold detection. The amplification and comparator circuits of each event driven pixel typically require DC bias currents on the order of nano-amperes, resulting in milliwatts of power consumption in mega-pixel event driven sensors regardless of whether there are any events that occur in an external scene. In other words, the current power consumption of many event driven pixels make such event driven pixels unsuitable for use with battery-operated, always-on event driven sensors in which sub-milliwatt power consumption of the event driven sensors is desired (e.g., for prolonged battery life).

Some event driven pixels (a) measure, without amplification in the output stage, a voltage generated based on photocurrent output from a photosensor and (b) include a common-source gm-stage to make up for the lack of signal amplification in the output stage. Use of a common-source gm-stage is expected to lead to excessive non-uniformity, increased non-linearity, challenges in setting an operating point properly for all event driven pixels of an event driven sensor, and/or challenges in calibrating an event driven pixel. In addition, because signal amplification only occurs after the output stage, the noise performance of event driven pixels using a common-source gm-stage is expected to be inferior to the event driven sensors described above.

To address these concerns, several event driven pixels of the present technology each include (a) a photosensor configured to generate photocurrent in response to incident light received from an external scene, (b) a photocurrent-to-voltage converter coupled to the photosensor to convert the photocurrent to a voltage, and (c) a passive difference circuit coupled to the photocurrent-to-voltage converter and configured to generate a difference signal or analog signal level (e.g., a difference voltage relative to a reset time) based at least in part on the voltage. Use of passive difference circuits can reduce power consumption of the event driven pixels. In some embodiments, a passive difference circuit of the present technology can be AC coupled. In these and other embodiments, the difference circuit can include a source follower buffer or transistor. Including a source follower buffer in the difference circuit is expected to (a) yield improved uniformity and/or linearity, and/or (b) improve the dynamic response of the event driven pixel, especially in comparison to event driven pixels that employ a common-source amplifier to re-introduce gain. In these and other embodiments, an event driven pixel of the present technology can include event threshold detection on a column level (a) to reduce static power consumption of the event driven pixel and/or (b) to implement frame-based readout of the event driven pixel.

In these and other embodiments, a photocurrent-to-voltage converter of the present technology can include an amplifier. The amplifier of the photocurrent-to-voltage converter can be employed to increase a response speed of a change of the voltage output from the photocurrent-to-voltage converter. In other words, the amplifier can be employed in low-latency applications to increase the speed with which the difference circuit of the event driven pixel produces the analog signal level based on the voltage output from the photocurrent-to-voltage converter. In some embodiments, the amplifier of the photocurrent-to-voltage converter can be configured to receive an enable signal to selectively enable (or disable) the amplifier for power savings. For example, the amplifier of the photocurrent-to-voltage converter can be powered down at times when the event driven pixel is not outputting the analog signal level (e.g., when a frame is not being read out), thereby reducing the power consumption of the event driven pixel.

In these and still other embodiments, event driven pixels of the present technology include a reset control circuit. The reset control circuit can be configured to (a) initialize the event driven pixel in response to assertion of a global reset signal and/or (b) reset the event driven pixel when an analog signal level is read out from the event driven pixel (e.g., in response to assertion of a row select signal) and the analog signal level indicates an event has occurred within an external scene (e.g., resulting in assertion of an acknowledge signal). In some embodiments, event driven pixels of the present technology can utilize capacitor matching between several capacitors of the difference circuit to reduce, minimize, or eliminate gain error of the difference circuit. Therefore, event driven pixels of the present technology are expected to be suitable in use with battery-operated, always-on event driven sensors while avoiding several of the challenges discussed above and observed in many event driven pixels.

B. SELECTED EMBODIMENTS OF LOW POWER EVENT DRIVEN PIXELS, RESET CONTROL CIRCUITS, AND ASSOCIATED SYSTEMS, DEVICES, AND METHODS

FIG. 1 is a partial schematic block diagram of an imaging system 100 configured in accordance with various embodiments of the present technology. As shown, the imaging system 100 includes an event driven pixel 120 and a threshold comparison circuit 108. The threshold comparison circuit 108 can be incorporated into the event driven pixel 120 in other embodiments of the present technology.

The event driven pixel 120 of FIG. 1 includes a photosensor 102, a photocurrent-to-voltage converter 104, a difference circuit 106, and a reset control circuit 110. The photosensor 102 is illustrated as a photodiode in FIG. 1 having an anode coupled to ground (e.g., a negative power supply rail or another reference voltage) and a cathode coupled to the photocurrent-to-voltage converter 104. In operation, the photosensor 102 of FIG. 1 is configured to photogenerate charge or photocurrent in response to incident light 114 received from an external scene. In other embodiments of the present technology, the photosensor 102 may be another suitable type of photosensor or photodetector (e.g., a metal-semiconductor-metal (MSM) photodetector, a phototransistor, a photoconductive detector, or a phototube).

The photocurrent-to-voltage converter 104 of FIG. 1 is coupled to the photosensor 102 and is configured to convert photocurrent generated by the photosensor 102 to a voltage. The difference circuit 106 is coupled to the photocurrent-to-voltage converter 104. Based on a voltage received from the photocurrent-to-voltage converter 104, the difference circuit 106 is configured to (a) sample a reference signal or voltage when the event driven pixel 120 is reset and (b) generate a difference signal or voltage (e.g., an analog signal level) relative to the reference signal (e.g., relative to a last time the event driven pixel 120 was reset). When a row select signal rsel(m) is asserted, the difference circuit 106 can output the difference signal onto a bit or column line 107. More specifically, the difference circuit 106 can output the difference signal to the threshold comparison circuit 108 via the column line 107.

In some embodiments, the photocurrent-to-voltage converter 104 can be configured to receive an enable signal EN. As discussed in greater detail below with reference to FIGS. 11 and 12, the enable signal EN can be used to selectively enable (e.g., power up, such as turn on, enable current flow, or force into a higher power mode or state) or disable (e.g., power down, such as shut off, disable current flow, or force into a lower power mode or state) one or more amplifiers of the photocurrent-to-voltage converter 104. Disabling the amplifiers is expected to reduce power consumption of the event driven pixel 120, thereby reducing power consumption of the imaging system 100 and/or an image sensor (not shown) incorporating the imaging system 100.

The reset control circuit 110 controls reset of the event driven pixel 120. More specifically, the reset control circuit 110 receives a global reset signal GRST, the row select signal rsel(m), and an acknowledge signal col_ack(n). As discussed in greater detail below with reference to FIGS. 2-6, the reset control circuit is configured, based on assertion of the global reset signal GRST, the row select signal rsel(m), and/or the acknowledge signal col_ack(n), to (a) generate a reset signal RST and (b) initiate sampling of a new reference signal in the difference circuit 106 in response to assertion of the reset signal RST.

The threshold comparison circuit 108 is coupled to an output of the difference circuit 106. In the illustrated embodiment, the threshold comparison circuit 108 is a circuit peripheral to the event driven pixel 120 and is coupled to the event driven pixel 120 via the column line 107. Placement of the threshold comparison circuit 108 on the column line 107 such that the threshold comparison circuit 108 is shared amongst the event driven pixel 120 and other event driven pixels (not shown) coupled to the column line 107 is expected to reduce static power consumption in comparison to event driven pixels incorporating dedicated threshold comparison circuits.

In operation, the threshold comparison circuit 108 is configured to detect events that occur within the external scene. More specifically, when an event occurs in the external scene, the event is indicated in the incident light 114 that is received by the photosensor 102 as a quick or sudden change in intensity or brightness. In other words, if the external scene is static such that no event is occurring, the brightness of the incident light 114 remains substantially unchanged. As such, the photocurrent generated by the photosensor 102 remains substantially constant. If, however, an event (e.g., movement) occurs within the external scene, the event is indicated with an asynchronous quick or sudden change in the brightness of the incident light 114 received by the photosensor 102. The change in brightness can be from darker to brighter or from brighter to darker. Thus, there can be an asynchronous change in the photocurrent generated by the photosensor 102 that, in turn, can result in a change in the difference signal generated by the difference circuit 106. Therefore, the threshold comparison circuit 108 can be configured to receive the difference signal from the difference circuit 106, compare the difference signal to one or more threshold values or amounts, and detect events that occur in the external scene based on the comparison(s). For example, the threshold comparison circuit 108 can detect that an event has occurred in the external scene when a magnitude of the difference signal output by the difference circuit 106 exceeds a magnitude of a threshold value.

When the threshold comparison circuit 108 detects an event, the acknowledge signal col_ack(n) can be asserted to prompt the reset control circuit 110 to (a) assert the reset signal RST to reset the event driven pixel 120 and (b) initiate sampling of a new reference voltage in the difference circuit 106. Additionally, or alternatively, the threshold comparison circuit 108 can output event information (e.g., where an event is detected, such as the x-y coordinates of the photosensor 102 in a pixel array used to detect the event; the polarity of change in the photocurrent for that event (e.g., brighter or darker); and/or a time the event occurred) for recording. On the other hand, when the threshold comparison circuit 108 does not detect an event, the acknowledge signal col_ack(n) can be left unasserted such that (absent assertion of the global reset signal GRST) the event driven pixel 120 is not reset by the reset control circuit 110, and the difference circuit 106 continues to generate a difference signal based on the formerly sampled reference voltage.

It is noted that an image sensor incorporating the imaging system 100 of FIG. 1 does not need to record an entire regular image, and therefore is not burdened with having to capture all of the highly redundant information of a normal image from frame to frame. Instead, the image sensor can record only event information. In other words, outside of threshold comparison performed by the threshold comparison circuit 108, the image sensor can ignore portions of frames of images or videos in which no event was detected, thereby enabling ultra-high frame rates and/or ultra-high-speed capabilities with a low data rate. In some embodiments, an event may be read out synchronously or asynchronously. In these and other embodiments, event data from the event driven pixel 120 may be combined with a normal image or video capture to reconstruct a high-frame-rate, high-quality image or video with event detection via software, an artificial intelligence (AI) network, or other suitable technology.

Figure 2:
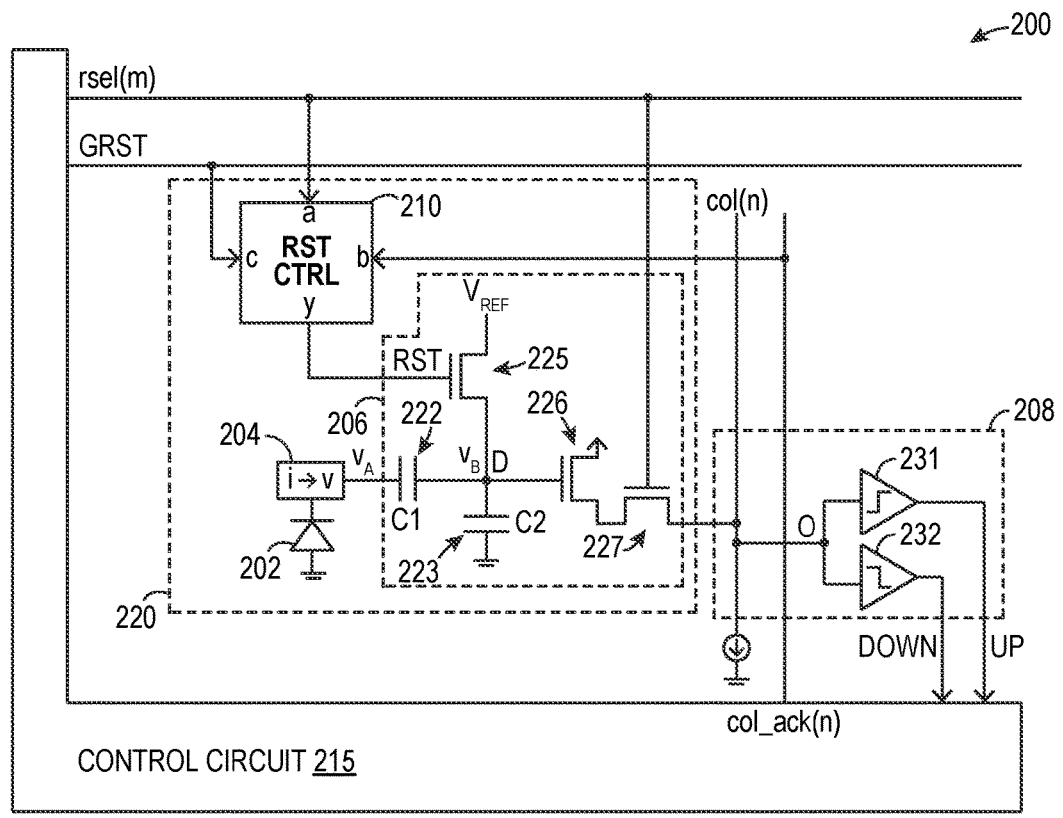

FIG. 2 is a partial schematic diagram of an imaging system 200 configured in accordance with various embodiments of the present technology. The imaging system 200 can be the imaging system 100 of FIG. 1 or another imaging system of the present technology. As shown, the imaging system 200 includes a control circuit 215, an event driven pixel 220, and a threshold comparison circuit 208.

The event driven pixel 220 includes a photosensor 202, a photocurrent-to-voltage converter 204, a difference circuit 206, and a reset control circuit 210. The photosensor 202 includes an anode coupled to ground (e.g., a negative power supply rail or another reference voltage) and a cathode. The photocurrent-to-voltage converter 204 of the event driven pixel 220 is coupled to the cathode of the photosensor 202 and is configured to convert photocurrent generated by the photosensor 202 to a voltage $V_A$. In some embodiments, the voltage $V_A$ has a logarithmic relation with the intensity of incident light received by the photosensor 202 from an external scene. Several schematic configurations of the photocurrent-to-voltage converter 204 are discussed in greater detail below with reference to FIGS. 9-12.

The difference circuit 206 of the event driven pixel 220 is coupled to the output of the photocurrent-to-voltage converter 204. In the illustrated embodiment, the difference circuit 206 includes a first capacitor 222 having a capacitance C1, a second capacitor 223 having a capacitance C2, a reset transistor 225, a source follower buffer or transistor 226, and a row select transistor 227. The first capacitor 222, the second capacitor 223, the reset transistor 225, and the source follower transistor 226 are coupled to one another via node D. More specifically, the first capacitor 222 is coupled between the output of the photocurrent-to-voltage converter 204 and node D; the second capacitor 223 is coupled between ground (e.g., a negative power supply rail or another reference voltage) and node D; a gate of the source follower transistor 226 is coupled to node D; and a source of the reset transistor 225 is coupled to node D. A drain of the source follower transistor 226 is coupled to a supply voltage (e.g., a positive power supply rail or another reference voltage), and a source of the source follower transistor 226 is coupled to a drain of the row select transistor 227. In some embodiments, the source follower transistor 226 is a linear source follower buffer. A source of the row select transistor 227 is coupled to a column line col(n), and a gate of the row select transistor 227 is configured to receive a row select signal rsel(m) that is controlled by the control circuit 215 of the imaging system 200.

The difference circuit 206 is AC-coupled to the photocurrent-to-voltage converter 204. In operation, the first capacitor 222 and the second capacitor 223 of the difference circuit 206 together function as a high pass filter that is configured to filter out lower frequency components from the output of photosensor 202 and/or the photocurrent-to-voltage converter 204. Thus, the event driven pixel 220 can ignore slow or gradual changes in the photocurrent generated by the photosensor 202 in response to incident light from an external scene, and can instead detect quick or sudden changes that occur in the photocurrent generated by the photosensor 202 in response to the incident light. Based at least in part on the voltage $V_A$, the difference circuit 206 can generate a signal or voltage $V_B$ at node D that is applied to the gate of the source follower transistor 226 such that the source follower transistor 226 outputs a corresponding difference signal (e.g., an analog signal level) to the row select transistor 227. In other words, based at least in part on the voltage $V_B$ at node D, the source follower transistor 226 and the row select transistor 227 can output a difference signal onto the column line col(n) when the row select signal rsel(m) applied to the gate of the row select transistor 227 is asserted by the control circuit 215. In addition, because the first capacitor 222 and the second capacitor 223 are passive components, the difference circuit 206 consumes a small amount of power in comparison to difference circuits employing active circuit components, making the difference circuit 206 suitable for use in low power, battery-operated, and/or always-on event driven sensors. The difference circuit 206 can therefore be considered a low-power, passive difference detection circuit.

Difference signals output from the event driven pixel 220 onto the column line col(n) are fed into the threshold comparison circuit 208. As shown, the threshold comparison circuit 208 includes a first comparator 231 and a second comparator 232, each having an input coupled to the column line col(n) via node O. The first comparator 231 is configured to compare a difference signal output by the event driven pixel 220 to a first threshold, and the second comparator 232 is configured to compare the difference signal to a second threshold. In some embodiments, the first comparator 231 may be triggered when the brightness or intensity of light incident on the photosensor 202 of the event driven pixel 220 changes in one direction (e.g., from darker to brighter). When triggered, the first comparator 231 can assert a signal UP that can indicate that an event has occurred in an external scene. In these and other embodiments, the second comparator 232 may be triggered when the brightness or intensity of light incident on the photosensor 202 changes in the other direction (e.g., from brighter to darker). When triggered, the second comparator 232 can assert a signal DOWN that can indicate that an event has occurred in the external scene. The signals UP and DOWN are passed to the control circuit 215, and the control circuit 215 can assert the acknowledge signal col_ack(n) when the signal UP or the signal DOWN indicate that an event has occurred in the external scene (e.g., when the signal UP or the signal DOWN is asserted).

Referring again to the event driven pixel 220 of FIG. 2, the reset transistor 225 of the difference circuit 206 is arranged as a reset switch. More specifically, the reset transistor 225 is arranged as a switch for a switched-capacitor filter formed by the first capacitor 222 and the second capacitor 223. As shown, the reset transistor 225 includes (a) a drain coupled to a reference voltage $V_{REF}$ (e.g., a positive power supply rail or another reference voltage) and (b) a gate configured to receive a reset signal RST from the reset control circuit 210. As discussed in greater detail below, the difference circuit 206 can be reset or initialized when the reset control circuit 210 asserts the reset signal RST.

As shown in FIG. 2, the reset control circuit 210 includes a first input (input a) configured to receive the row select signal rsel(m), a second input (input b) configured to receive an acknowledge signal col_ack(n), and a third input (input c) configured to receive a global reset signal GRST. The reset control circuit 210 additionally includes an output (output y) configured to apply the reset signal RST to the gate of the reset transistor 225 of the difference circuit 206. Assertion of the reset signal RST can depend, at least in part, on the states of the row select signal rsel(m), the acknowledge signal col_ack(n), and the global reset signal GRST received from the control circuit 215 and input into the reset control circuit 210. For example, as discussed in greater detail below, the control circuit 215 can assert the row select signal rsel(m) to readout a difference signal from the difference circuit 206, and can assert the acknowledge signal col_ack(n) when the threshold comparison circuit 208 detects an event has occurred in the external scene based on the difference signal. Continuing with this example, the reset control circuit 210 can assert the reset signal RST when the row select signal rsel(m) and the acknowledge signal col_ack(n) are asserted at the same time. As another example, the control circuit 215 can assert the global reset signal GRST to reset or initialize the event driven pixel 220, and the reset control circuit 210 can assert the reset signal RST in response to assertion of the global reset signal GRST.

Figure 3:
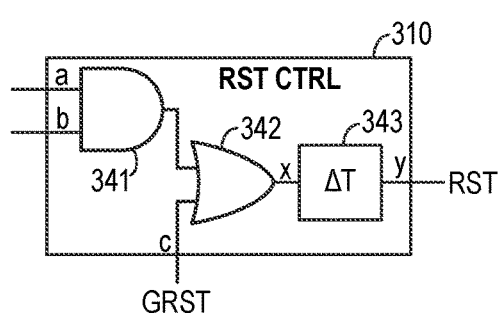
FIGS. 3 and 4 are partial schematic diagrams of reset control circuits configured in accordance with various embodiments of the present technology.
Figure 4:
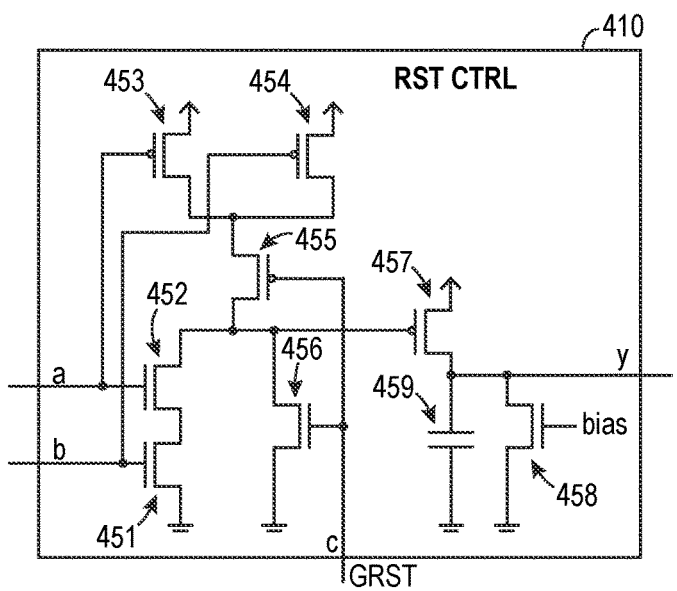

FIGS. 3 and 4 are partial schematic diagrams of reset control circuits 310 and 410, respectively, that can be implemented as the reset control circuit 210 of FIG. 2 in various embodiments of the present technology. Referring first to FIG. 3, the reset control circuit 310 includes an AND logic gate 341, an OR logic gate 342, and a delay element 343. The AND logic gate 341 includes a first input configured to receive the row select signal rsel(m) via the first input (input a) of the reset control circuit 310, and a second input configured to receive the acknowledge signal col_ack (n) via the second input (input b) of the reset control circuit 310. The OR logic gate 342 includes a first input coupled to an output of the AND logic gate 341, a second input configured to receive the global reset signal GRST via the third input (input c) of the reset control circuit 310, and an output (output x) coupled to an input of the delay element 343. The delay element 343 includes an output coupled to the output (output y) of the reset control circuit 310.

In operation, the reset control circuit 310 is configured to assert the reset signal RST when (a) the global reset signal GRST is asserted or (b) the row select signal rsel(m) and the acknowledge signal col_ack(n) are asserted together. In other words, the reset control circuit 310 is configured to assert the RST whenever (a) the global reset signal GRST is asserted or (b) a difference signal is readout from the difference circuit 206 of the event driven pixel 220 of FIG. 2 and the difference signal indicates that an event has occurred in the external scene. Otherwise, the reset control circuit 310 outputs the reset signal RST in its unasserted state. As discussed in greater detail below, upon a falling edge of the output (output x) of the OR logic gate 342, the delay element 343 is configured to hold the reset signal RST in an asserted state for a refractory period. In other embodiments, the reset control circuit 310 can lack or omit the delay element (e.g., such that the output (output x) of the OR logic gate 342 is connected (e.g., directly) to the output (output y) of the reset control circuit 310, and/or such that the reset signal RST is deasserted upon the falling edge of the output (output x) of the OR logic gate 342 without a refractory period).

Referring now to FIG. 4, the reset control circuit 410 includes a plurality of transistors (identified individually in FIG. 4 as first through eight transistors 451-458) and a capacitor 459. The first through fourth transistor 451-454 are arranged as a NAND logic gate. More specifically, a source of the first transistor 451 is coupled to ground (e.g., a negative power supply rail or another reference voltage), a drain of the first transistor 451 is coupled to a source of the second transistor 452, and a gate of the first transistor 451 is configured to receive the acknowledge signal col_ack(n) via the second input (input b) of the reset control circuit 410. A drain of the second transistor 452 is coupled to a drain of the third transistor 453 and to a drain of the fourth transistor 454, and a gate of the second transistor 452 is configured to receive the row select signal rsel(m) via the first input (input a) of the reset control circuit 410. A source of the third transistor 453 is coupled to a supply voltage (e.g., a positive power supply rail or another reference voltage), the drain of the third transistor 453 is coupled to the drain of the fourth transistor 454, and a gate of the third transistor 453 is configured to receive the row select signal rsel(m) via the first input (input a) of the reset control circuit 410. A source of the fourth transistor 454 is coupled to the supply voltage, and a gate of the fourth transistor 454 is configured to receive the acknowledge signal col_ack(n) via the second input (input b) of the reset control circuit 410.

The seventh transistor 457 of the reset control circuit 410 is arranged as a low-active switch charging the capacitor 459. In particular, a source of the seventh transistor 457 is coupled to the supply voltage, a gate of the seventh transistor 457 is coupled to an output of the NAND logic gate (e.g., to drain of the second transistor 452, to the drain of the third transistor 453, and to the drain of the fourth transistor 454), and a drain of the seventh transistor 457 is coupled to the capacitor 459 and to the output (output y) of the reset control circuit 410. The capacitor 459 is coupled between (a) ground and (b) the drain of the seventh transistor 457 and the output (output y) of the reset control circuit 410.

The fifth transistor 455 and the sixth transistor 456 of the reset control circuit 410 are arranged as pass transistors. More specifically, (a) a source of the fifth transistor 455 is coupled to the drain of the third transistor 453 and to the drain of the fourth transistor 454; (b) a drain of the fifth transistor 455 is coupled to the drain of the second transistor 452 and to the gate of the seventh transistor 457; (c) a source of the sixth transistor 456 is coupled to ground; and (d) a drain of the sixth transistor 456 is coupled to the drain of the second transistor 452, to the drain of the fifth transistor 455, and to the gate of seventh transistor 457. A gate of the fifth transistor 455 and a gate of the sixth transistor 456 are each configured to receive the global reset signal via the third input (input c) of the reset control circuit 410.

The eighth transistor 458 is arranged as a resistive element configured to discharge the capacitor 459 when the low-active switch is released (e.g., when the seventh transistor 457 is turned off). More specifically, a source of the eighth transistor 458 is coupled to ground; a drain of the eighth transistor 458 is coupled to the drain of the seventh transistor 457, to the capacitor 459, and to the output (output y) of the reset control circuit 410; and a gate of the eighth transistor 458 is configured to receive a programmable or trimmable bias voltage. As discussed in greater detail below, the eighth transistor 458 is configured to hold the reset signal RST in an asserted state for a refractory period when the seventh transistor 457 is turned from on to off.

In operation, the reset control circuit 410 functions similar to the reset control circuit 310. In particular, when both the row select signal rsel(m) and the acknowledge signal col_ack(n) are asserted, the seventh transistor 457 is turned on via the output of the NAND logic gate (formed by the first through fourth transistors 451-454), the capacitor 459 is charged, and the reset signal RST output from the reset control circuit 410 is asserted. In addition, when the global reset signal GRST is asserted, the seventh transistor 457 is turned on via the sixth transistor 456 acting as a pass transistor, the capacitor 459 is charged, and the reset signal RST output from the reset control circuit 410 is asserted. At all other times, the seventh transistor 457 is off, the capacitor 459 is discharged or left uncharged, and the reset signal RST output from the reset control circuit 410 is not asserted.

The capacitor 459 of the reset control circuit 410 is discharged via the eighth transistor 458 when (a) the global reset signal is deasserted after being asserted or (b) either the row select signal rsel(m) or the acknowledge signal col_ack (n) are deasserted after both the row select signal rsel(m) and the acknowledge signal col_ack(n) were asserted together. The rate at which the capacitor 459 is discharged via the eighth transistor 458 (a) is dependent upon the programmable bias voltage applied to the gate of the eighth transistor 458 and (b) is negatively correlated with a length of the refractory period during which the reset signal RST is held asserted after the eighth transistor 458 begins discharging the capacitor 459. For example, higher bias voltages can be used for faster discharging of the capacitor 459 via the eighth transistor 458 and therefore for shorter refractory periods. Continuing with this example, lower bias voltages can be used for slower discharging of the capacitor 459 via the eighth transistor 458 and therefore for longer refractory periods.

It is appreciated that the reset control circuit 210 of FIG. 2 may have another schematic configuration in other embodiments of the present technology than the schematic configurations shown in FIGS. 2, 3, and 4, and that the other schematic can selectively reset the event driven pixel 220 based on the row select signal rsel(m), the acknowledge signal col_ack(n), and/or the global reset signal GRST. For example, as discussed above, the delay element 343 of the reset control circuit 310 of FIG. 3 can be omitted in some embodiments of the present technology such that there is not a refractory period after the global reset signal GRST, the acknowledge signal col_ack(n), and/or the row select signal rsel(m) are deasserted. As another example, in some embodiments, the reset control circuit 410 of FIG. 4 can lack a refractory period after the global reset signal GRST, the acknowledge signal col_ack(n), and/or the row select signal rsel(m) are deasserted. As a specific example, the capacitor 459 and/or the eighth transistor 458 of the reset control circuit 410 can be omitted, and/or the bias voltage applied to the gate of the eighth transistor 458 can be set such that the capacitor 459 is quickly (e.g., immediately) discharged. It is further appreciated that the difference circuit 206, the event driven pixel 220, the threshold comparison circuit 208, and/or the control circuit 215 may have other schematic configurations in other embodiments than the schematic configurations shown in FIG. 2. Indeed, an example of an alternative schematic configuration of the present technology that can be used in addition to or in lieu of the difference circuit 206 and/or the event driven pixel 220 of FIG. 2 is discussed in detail below with respect to FIG. 6.

Figure 5:
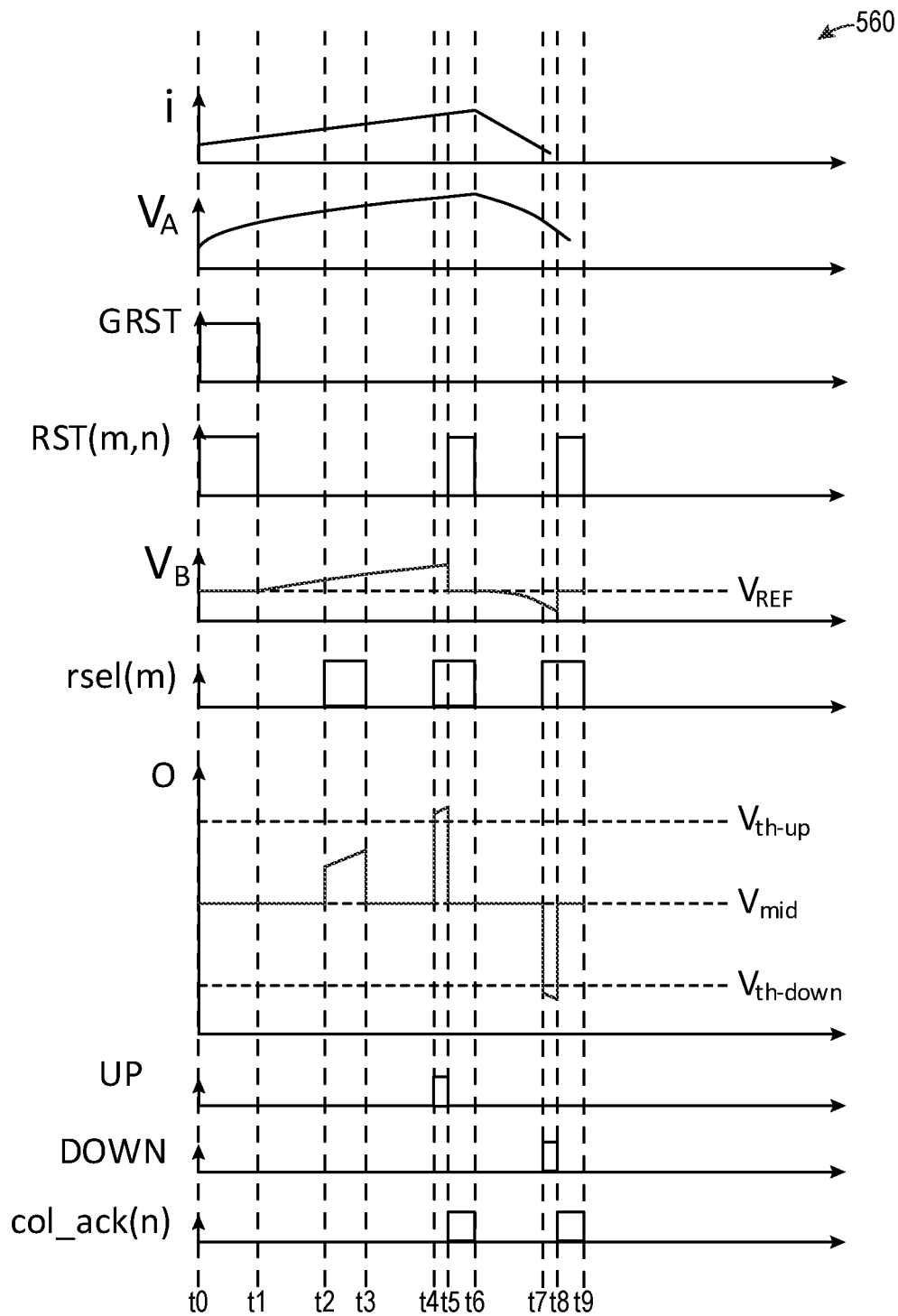
FIG. 5 is a timing diagram illustrating a method of operating an event driven pixel in accordance with various embodiments of the present technology.

FIG. 5 is a timing diagram 560 illustrating a method of operating the imaging system 200 and the event driven pixel 220 of FIG. 2 in accordance with various embodiments of the present technology. Referring to FIGS. 2 and 5 together, photocurrent generated by the photosensor 202 is assumed to be linear (as shown in the top plot in FIG. 5) for the sake of clarity and understanding. It is also assumed that the photocurrent-to-voltage converter 204 converts the photocurrent generated by the photosensor 202 into a logarithmically increasing voltage $V_A$ (as shown in the second plot from the top of FIG. 5). In other embodiments, the voltage $V_A$ produced by the photocurrent-to-voltage converter 204 can be another function (e.g., linear, square-root, etc.) of the photocurrent generated by the photosensor 202.

At time t0 shown in FIG. 5, the control circuit 215 of the imaging system 200 implements a global reset by asserting the global reset signal GRST to initialize the event driven pixel 220. When the global reset signal GRST is asserted, the reset control circuit 210 of the event driven pixel 220 asserts the reset signal RST applied to the gate of the reset transistor 225. In turn, the reset transistor 225 is turned on, the voltage $V_B$ at node D is brought to the reference voltage $V_{REF}$, and the voltage on the first capacitor 222 is brought to a voltage equivalent to the difference between the voltage $V_A$ output from the photocurrent-to-voltage converter 204 and the reference voltage $V_{REF}$ (e.g., $V_A - V_{REF}$).

At time t1, the control circuit 215 deasserts the global reset signal GRST. In response, the reset control circuit 210 deasserts the reset signal RST, turning off the reset transistor 225. From time t1 to time t2, the voltage $V_B$ at node D changes in proportion to a change of the voltage $V_A$ output from the photocurrent-to-voltage converter 204 relative to time t1 (e.g., in proportion to a change of $V_A(t)-V_A(t1)$). The voltage $V_B$ appears at node D with a relative gain or attenuation that is dependent upon the capacitance C1 of the first capacitor 222 and the capacitance C2 of the second capacitor 223. For example, the voltage $V_B$ appears at node D with a relative gain or attenuation given by the capacitance C1 divided by the sum of the capacitance C1 and the capacitance C2 (e.g., $C1/(C1+C2)$) due to the capacitive voltage divider formed at least in part by the first capacitor 222 and the second capacitor 223.

At time t2, the control circuit 215 asserts the row select signal rsel(m) (e.g., as part of a rolling readout of pixels in the imaging system 200 to locate pixels of the imaging system 200 that have detected events), thereby activating the row select transistor 227. In turn, a difference signal (e.g., an analog signal level) corresponding to the voltage $V_B$ applied to the gate of the source follower transistor 226 at time t2 is output onto the column line col(n) via the row select transistor 227. The difference signal appears at node O between time t2 and time t3, and is fed into the first and second comparators 231 and 232 of the threshold comparison circuit 208. The first comparator 231 compares the difference signal to a first threshold voltage $V_{th-up}$, and the second comparator 232 compares the difference signal to a second threshold voltage $V_{th-down}$. In some embodiments, column readout of the difference signal may involve a programmable gain amplifier and/or an analog-to-digital converter.

As shown in FIG. 5, the difference signal output onto the column line col(n) and appearing at node O between time t2 and time t3 does not exceed the first threshold voltage $V_{th-up}$ or the second threshold voltage $V_{th-down}$. Thus, the difference signal output between time t2 and time t3 will not trigger the first comparator 231 or the second comparator 232. As such, both the signal UP and the signal DOWN remain unasserted during this time period. Thus, the control circuit 215 does not register an event based on the difference signal output at time t2, and the acknowledge signal col_ack(n) remains unasserted. Because the acknowledge signal col_ack(n) remains unasserted, the reset control circuit 210 of the event driven pixel 220 does not reset the difference circuit 206 (e.g., absent an intervening assertion of the global reset signal GRST). Thus, the voltage $V_B$ at node D continues to change in proportion to the change of the voltage $V_A$ output from the photocurrent-to-voltage converter 204 relative to the time t1 (e.g., in proportion to a change of $V_A(t)-V_A(t1)$). At time t3, the control circuit 215 deasserts the row select signal rsel(m).

At time t4, the control circuit 215 asserts the row select signal rsel(m) (e.g., as part of a rolling readout of pixels of the imaging system 200 to locate pixels of the imaging system 200 that have detected events). In turn, the row select transistor 227 is activated, and a difference signal (e.g., an analog signal level) corresponding to the voltage $V_B$ applied to the gate of the source follower transistor 226 at time t4 is output onto the column line col(n) via the row select transistor 227 and appears at node O between time t4 and time t5. The difference signal is fed into the first and second comparators 231 and 232 of the threshold comparison circuit 208. As discussed above, column readout of the difference signal may involve a programmable gain amplifier and/or an analog-to-digital converter. As shown in FIG. 5, the difference signal exceeds the first threshold voltage $V_{th\text{-}up}$ and does not exceed the second threshold voltage $V_{th\text{-}down}$. Thus, the difference signal triggers the first comparator 231 and does not trigger the second comparator 232. As such, the first comparator 231 asserts the signal UP while the signal DOWN output from the second comparator 232 remains unasserted.

At time t5, in response to assertion of the signal UP, the control circuit 215 registers an event and asserts the acknowledge signal col_ack(n). Because both the acknowledge signal col_ack(n) and the row select signal rsel(m) are asserted between time t5 and time t6, the reset control circuit 210 implements a local reset of the event driven pixel 220 by asserting the reset signal RST between time t5 and time t6. In turn, the asserted reset signal RST is applied to the gate of the reset transistor 225, and the difference circuit 206 of the event driven pixel 220 is reset. More specifically, the voltage $V_B$ at node D of the difference circuit 206 is reset to the reference voltage $V_{REF}$, and a new signal $(V_A(t6)-V_{REF})$ is sampled onto the first capacitor 222. Other pixels of row "m" that output difference signals indicating occurrence of an event will also be reset at this time. At time t6, the control circuit 215 deasserts the row select signal rsel(m) and the acknowledge signal col_ack(n). In response, the reset control circuit 210 deasserts the reset signal RST.

As shown in FIG. 5, the photocurrent output by the photosensor 202 and the voltage $V_A$ output by the photocurrent-to-voltage converter 204 decrease between time t6 and time t7. Because the voltage $V_B$ at node D changes in proportion to a change of the voltage $V_A$ output from the photocurrent-to-voltage converter 204 relative to the time t6 (e.g., relative the last time the difference circuit 206 was reset, or in proportion to a change of $V_A(t)-V_A(t6)$), the voltage $V_B$ at node D also decreases between time t6 and time t7.

At time t7, the control circuit 215 asserts the row select signal rsel(m) (e.g., as part of a rolling readout of pixels of the imaging system 200 to locate pixels of the imaging system 200 that have detected events). In turn, the row select transistor 227 is activated, and a difference signal (e.g., an analog signal level) corresponding to the voltage $V_B$ applied to the gate of the source follower transistor 226 at time t7 is output onto the column line col(n) via the row select transistor 227 and appears at node O between time t7 and time t8. The difference signal is fed into the first and second comparators 231 and 232 of the threshold comparison circuit 208. As discussed above, column readout of the difference signal may involve a programmable gain amplifier and/or an analog-to-digital converter. As shown in FIG. 5, the difference signal exceeds the second threshold voltage $V_{th\text{-}down}$ and does not exceed the first threshold voltage $V_{th\text{-}up}$. Thus, the difference signal triggers the second comparator 232 and does not trigger the first comparator 231. As such, the second comparator 232 asserts the signal DOWN while the signal UP output from the first comparator 231 remains unasserted.

At time t8, in response to assertion of the signal DOWN, the control circuit 215 registers an event and asserts the acknowledge signal col_ack(n). Because both the acknowledge signal col_ack(n) and the row select signal rsel(m) are asserted between time t8 and time t9, the reset control circuit 210 implements a local reset of the event driven pixel 220 by asserting the reset signal RST between time t8 and time t9. In turn, the asserted reset signal RST is applied to the gate of the reset transistor 225, and the difference circuit 206 of the event driven pixel 220 is reset. More specifically, the voltage $V_B$ at node D of the difference circuit 206 is reset to the reference voltage $V_{REF}$, and a new signal $(V_A(t9)-V_{REF})$ is sampled onto the first capacitor 222. Other pixels of row "m" that output difference signals indicating occurrence of an event will also be reset at this time. At time t9, the control circuit 215 deasserts the row select signal rsel(m) and the acknowledge signal col_ack(n). In turn, the reset control circuit 210 deasserts the reset signal RST.

Thus, the event driven pixel 220 of the imaging system 200 of FIG. 2 operates in a manner similar to in-pixel, AC-coupled correlated double sampling (CDS) pixels often found in global shutter sensors. In contrast to such pixels, however, a reset level is not used a reference in the event driven pixel 220 or in the imaging system 200. Rather, a light level corresponding to a last time the event driven pixel 220 is reset is used as a reference. In addition, in contrast to such in-pixel, AC-coupled CDS pixels, reset of the event driven pixel 220 of FIG. 2 is conditional on (a) a global reset of the imaging system 200 and (b) the event driven pixel 220 outputting a difference signal that indicates an event has occurred in an external scene (e.g., a difference signal that exceeds the first threshold voltage $V_{th\text{-}up}$ or the second threshold voltage $V_{th\text{-}down}$).

FIG. 6 is a partial schematic diagram of another event driven pixel 620 configured in accordance with various embodiments of the present technology. As shown, the event driven pixel 620 is similar to the event driven pixel 220 of FIG. 2. For example, the event driven pixel 620 includes (a) a photosensor 602, (b) a photocurrent-to-voltage converter 604, and (c) a difference circuit 606 having a first capacitor 622, a second capacitor 623, a reset transistor 625, a source follower transistor 626, and a row select transistor 627. Although not shown in FIG. 6, the event driven pixel 620 can further include a reset control circuit that is similar to the reset control circuit 210 of FIG. 2 and that has an output coupled to a gate of the reset transistor 625. The photosensor 602, the photocurrent-to-voltage converter 604, the difference circuit 606, and the reset control circuit of the event driven pixel 620 can operate similar to the photosensor 202, the photocurrent-to-voltage converter 204, the difference circuit 206, and the reset control circuit 210, respectively, of FIG. 2. Therefore, a detailed discussion of these components of the event driven pixel 620 is omitted here for the sake of brevity. A first reference voltage $V_{REF1}$ is illustrated in FIG. 6 and can be the reference voltage $V_{REF}$ illustrated in FIG. 2 or another reference voltage of the present technology.

In contrast to the event driven pixel 220 of FIG. 2, the difference circuit 606 of the event driven pixel 620 of FIG. 6 further includes a passive MOS varactor 670 (e.g., a varicap). The varactor 670 includes a first transistor 671 and a second transistor 672. The first transistor 671 (a) is electrically coupled between a second reference voltage $V_{REF2}$ and the second capacitor 623, and (b) includes a gate configured to receive a sample and hold signal S&H. The second transistor 672 (a) is electrically coupled between a third reference voltage $V_{REF3}$ and the second capacitor 623, and (b) includes a gate configured to receive a signal Boost. As described in greater detail below, the varactor 670 can be employed in the event driven pixel 620 to provide signal amplification and reduce noise.

Characteristics of the varactor 670 will now explained with reference to FIGS. 7A and 7B. FIG. 7A is a partial, simplified schematic diagram of a MOS varactor circuit 780 configured in accordance with various embodiments of the present technology, and FIG. 7B is a timing diagram 785 illustrating a method of operating the MOS varactor circuit 780 of FIG. 7A. The MOS varactor circuit 780 can generally correspond to a portion of the event driven pixel 620 illustrated in FIG. 6. For example, the MOS varactor circuit 780 of FIG. 7A can generally correspond to the reset transistor 625, the second capacitor 623, the first transistor 671, and the second transistor 672 of the event driven pixel 620. Thus, for the sake of clarity and understanding, similar reference numbers and signals are used in FIGS. 7A and 7B as those used in FIG. 6.

As shown, the MOS varactor circuit 780 includes a switch 725 controlled by a reset signal RST, a switch 771 controlled by a sample and hold signal S&H, a switch 772 controlled by a signal Boost, and a MOS capacitor 723 having a drain terminal and a source terminal coupled to one another. The switch 725 selectively couples the gate of the MOS capacitor 723 to the reference voltage $V_{REF1}$. Similarly, the switch 771 selectively couples the source and drain terminals of the MOS capacitor 723 to the reference voltage $V_{REF2}$, and the switch 772 selectively couples the source and drain terminals of the MOS capacitor 723 to the reference voltage $V_{REF3}$. The switch 771 and the switch 772 can form at least part of a varactor 770.

Referring to FIGS. 7A and 7B together, when (i) the reset signal RST and the sample and hold signal S&H are both asserted and (ii) the signal Boost remains unasserted, the MOS varactor circuit 780 operates under a first phase of operation (e.g., a track or inversion phase) and a signal is sampled onto the MOS capacitor 723. More specifically, the drain and source terminals of the MOS capacitor 723 are biased to the reference voltage $V_{REF2}$ via the switch 771. Assuming (a) that the reference voltage $V_{REF2}$ is a low reference potential (e.g., ground, a negative power supply rail, or another reference voltage lower than the reference voltage $V_{REF1}$) and (b) that the reference voltage $V_{REF1}$ is large enough to cause channel inversion by pulling charges from the drain and source terminals of the MOS capacitor 723 to form a channel, the capacitance of the MOS capacitor 723 can be defined by the gate-oxide capacitances because the junction capacitance is at the reference voltage $V_{REF2}$.

On the other hand, when (i) the signal Boost is asserted and (ii) the reset signal RST and the sample and hold signal S&H are unasserted, the MOS varactor circuit 780 operates under a second phase of operation (e.g., an amplification or accumulation phase) and the voltage at node G is increased. More specifically, the drain and source terminals of the MOS capacitor 723 are biased to the reference voltage $V_{REF3}$. Assuming that the reference voltage $V_{REF3}$ is a high reference potential (e.g., $V_{DD}$, a positive power supply rail, or another reference voltage higher than the reference voltage $V_{REF1}$ and/or $V_{REF2}$), channel inversion charge will be removed. In addition, although charge at the gate (node G) of the MOS capacitor 723 will not change when the MOS varactor circuit 780 transitions into the second phase of operation, the capacitance seen by the gate (node G) of the MOS capacitor 723 is a series connection of the gate capacitance and the diffusion capacitance in the bulk of the semiconductor that is biased to ground or another low voltage. Because the series connection of these capacitances is smaller than the individual contribution of the gate-oxide capacitance and because the charge at the gate (node G) of the MOS capacitor 723 remains unchanged, the voltage at node G is increased to a potential given by Equations 1 and 2 below:

$$V_G = V_{REF1}(t1) * \frac{C_{oxide}}{\left(\dfrac{1}{C_{oxide}} + \dfrac{1}{C_{diffusion}}\right)}, \text{ with} \quad \text{Equation 1}$$

-continued
$$\frac{C_{oxide}}{\dfrac{1}{C_{oxide}} + \dfrac{1}{C_{diffusion}}} > 1 \quad \text{Equation 2}$$

The discussion of the MOS varactor circuit 780 above neglects fringe capacitance at the junction of the source and drain terminals of the MOS capacitor 723, which should be kept minimal. A three-terminal device, such as the three-terminal device 881 illustrated in FIG. 8, can be used in some embodiments of the present technology to reduce, minimize, or eliminate fringe capacitance at the junction of the source and drain terminals.

Referring again to FIG. 6 in light of the discussion of FIGS. 7A-8 above, when sampling a reference signal onto the first capacitor 622, the reset signal RST applied to the gate of the reset transistor 625 and the sample and hold signal S&H applied to the gate of the first transistor 671 of the varactor 670 can be asserted together while the signal Boost applied to the gate of the second transistor 672 of the varactor 670 can remain unasserted, such that a voltage $V_B$ is sampled onto the second capacitor 623 equivalent to the difference between the reference voltage $V_{REF1}$ and the reference voltage $V_{REF2}$ (e.g., $V_{REF1}$–$V_{REF2}$). As discussed above, the reference voltage $V_{REF2}$ can be a low reference potential (e.g., ground, a negative power supply rail, or another reference voltage lower than the reference voltage $V_{REF1}$). The reset signal RST can then be deasserted, forming a passive voltage divider over the first capacitor 622 and the second capacitor 223, as discussed above with reference to FIGS. 2 and 5. A voltage $V_B$ at node D therefore proportionately tracks the voltage $V_A$ output by the photocurrent-to-voltage converter 604, and appears at node D with a relative gain or attenuation given by the capacitance C1 of the first capacitor 622 divided by the sum of the capacitance C1 and the capacitance C2 of the second capacitor 623 (e.g., C1/(C1+C2)). During a rolling readout of an imaging system including the event driven pixel 620, the sample and hold signal S&H can be deasserted and (without overlapping) the signal Boost can be asserted to connect the bottom plate of the second capacitor 623 to the reference potential $V_{REF3}$ (e.g., $V_{DD}$, a positive power supply rail, or another reference voltage higher than the reference voltage $V_{REF1}$ and/or $V_{REF2}$) via the second transistor 672. This will remove the inversion charge in the channel formed on the second capacitor 623, which will reduce the capacitance C2 of the second capacitor 623 seen by the gate of the source follower transistor 626. In turn, the gain of the passive difference circuit 606 (e.g., provided by the capacitance C1 divided by the sum of the capacitance C1 and the capacitance C2 (e.g., C1/(C1+C2)) is brought closer to one. In this manner, the event driven pixel 620 can employ the varactor 670 to provide passive signal amplification and a reduction in noise by cycling the varactor 670 through inversion and accumulation phases.

FIGS. 9-12 are partial schematic diagrams of photocurrent-to-voltage converters 904, 1004, 1104, and 1204, respectively, configured in accordance with various embodiments of the present technology. The photocurrent-to-voltage converters 904, 1004, 1104, and 1204 can each be used in the event driven pixel 220 of FIG. 2 to convert photocurrent to a voltage and are therefore illustrated as being coupled to the photosensor 202 of FIG. 2. Each of the photocurrent-to-voltage converters 904, 1004, 1104, and 1204 can be used in other event driven pixels of the present technology, including the event driven pixel 620 of FIG. 6.

Therefore, each of the photocurrent-to-voltage converters 904, 1004, 1104, and 1204 can be coupled to the photosensor 602 or another photosensor of the present technology.

Referring first to FIG. 9, the photocurrent-to-voltage converter 904 includes a transistor 991 having (a) a source coupled to the cathode of the photosensor 202 and (b) a drain coupled to a supply voltage (e.g., a positive power supply rail or another reference voltage). A gate of the transistor 991 is coupled to a bias voltage. In operation, the photocurrent-to-voltage converters 904 is configured to convert photocurrent output by the photosensor 202 to a voltage $V_A$, which can be fed to a difference circuit (e.g., the difference circuit 206 of FIG. 2, the difference circuit 606 of FIG. 6, and/or another difference circuit of the present technology), as discussed above. More specifically, the photocurrent-to-voltage converter 904 is configured to generate a voltage $V_A$ that has a logarithmic or other (e.g., linear, square-root, etc.) relation with the intensity of incident light received by the photosensor 202 from an external scene.

Referring now to FIG. 10, the photocurrent-to-voltage converter 1004 includes a transistor 1091 having (a) a drain coupled to a supply voltage (e.g., a positive power supply rail or another reference voltage) and (b) a gate coupled to a bias voltage. The photocurrent-to-voltage converter 1004 further includes a plurality of transistors 1092 (identified individually in FIG. 10 as first through nth transistors 1092a-1092n) that are stacked in series with one another. The first transistor 1092a of the plurality includes a source coupled to the cathode of the photosensor 202, and the nth transistor 1092n of the plurality includes a drain coupled to a source of the transistor 1091 and to an output of the photocurrent-to-voltage converter 1004 at which the photocurrent-to-voltage converter 1004 generates a voltage $V_A$.

As shown, each of the first through nth transistors 1092a-1092n include a gate configured to receive a corresponding bias voltage. The bias voltages applied to the gates of the first through nth transistors 1092a-1092n can be identical, or at least some of the bias voltages can vary from one another. The bias voltages applied to the gates of the first through nth transistors 1092a-1092n can operate the first through nth transistors 1092a-1092n in weak inversion such that the first through nth transistors 1092a-1092n provide signal amplification. In other words, the first through nth transistors 1071a-1092n can be employed to amplify the voltage $V_A$ produced at the output (node A) of the photocurrent-to-voltage converter 1004.

Referring now to FIG. 11, the photocurrent-to-voltage converter 1104 includes a transistor 1191 having (a) a source coupled to the cathode of the photosensor 202 and (b) a drain coupled to a supply voltage (e.g., a positive power supply rail or another reference voltage). The photocurrent-to-voltage converter 1104 further includes an amplifier 1193 having (a) an input (e.g., an inverting input) coupled to the cathode of the photosensor 202 and to the source of the transistor 1191, and (b) an output coupled (i) to an output of the photocurrent-to-voltage converter 1104 at which the photocurrent-to-voltage converter 1104 generates a voltage $V_A$ and (ii) to a gate of the transistor 1191. In some embodiments, the amplifier 1193 can be an opamp and/or can include another input (not shown), such as a non-inverting input, that is coupled to ground (e.g., a negative power supply rail or another reference voltage).

The amplifier 1193 can be employed to increase the response speed of a change of the voltage $V_A$ generated at the output of the photocurrent-to-voltage converter 1104 between the source and the gate of the transistor 1191. In other words, the amplifier 1193 can be employed in low-latency applications to increase the speed with which a difference circuit (e.g., the difference circuit 206 of FIG. 2, the difference circuit 606 of FIG. 6, or another difference circuit of the present technology) produces the difference signal based on the voltage $V_B$ at node D (FIGS. 2 and 6).

As shown in FIG. 11, the amplifier 1193 can be configured to receive an enable signal EN<i>. The enable signal EN<i> can be used to selectively enable or disable the amplifier 1193. For example, the enable signal EN<i> can be used to selectively disable or place the amplifier 1193 in a powered-down mode (thereby reducing power consumption of the corresponding event driven pixel) at times when the corresponding event driven pixel is not sampling a reference signal or outputting a difference signal, and can selectively enable or place the amplifier 1193 in a powered-up mode at times when the corresponding event driven pixel is sampling a reference signal or is expected to output a difference signal onto the column line col(n) (e.g., when the row select signal rsel(m) is asserted). In some embodiments, the amplifier 1193 may require time to settle. In these embodiments, the enable signal EN<i> can be asserted a given time before a difference signal is readout from the corresponding event driven pixel onto the column line col(n).

Referring now to FIG. 12, the photocurrent-to-voltage converter 1204 represents a combination of the photocurrent-to-voltage converter 1004 of FIG. 10 and the photocurrent-to-voltage converter 1104 of FIG. 11. More specifically, the photocurrent-to-voltage converter 1204 includes a transistor 1291, a plurality of transistors 1292 (identified individually in FIG. 12 as first through nth transistors 1292a-1292n), and an amplifier 1293. The plurality of transistors 1292 are stacked in series with one another. The first transistor 1292a of the plurality includes a source coupled to the cathode of the photosensor 202 and to an input (e.g., an inverting input) of the amplifier 1293. The nth transistor 1292n of the plurality includes a drain coupled to a source of the transistor 1291. The amplifier 1293 includes an output coupled (i) to an output of the photocurrent-to-voltage converter 1204 at which the photocurrent-to-voltage converter 1204 generates a voltage $V_A$ and (ii) to a gate of the transistor 1291. In some embodiments, the amplifier 1293 can be an opamp and/or can include another input (not shown), such as a non-inverting input, that is coupled to ground (e.g., a negative power supply rail or another reference voltage). The transistor 1291 includes a drain coupled to a supply voltage (e.g., a positive power supply rail or another reference voltage).

Similar to the first through nth transistors 1092a-1092n of the photocurrent-to-voltage converter 1004 of FIG. 10, each of the first through nth transistors 1292a-1292n of FIG. 12 include a gate configured to receive a corresponding bias voltage. The bias voltages applied to the gates of the first through nth transistors 1292a-1292n can be identical, or at least some of the bias voltages can vary from one another. The bias voltages applied to the gates of the first through nth transistors 1292a-1292n can operate the first through nth transistors 1292a-1292n in weak inversion such that the first through nth transistors 1292a-1292n provide signal amplification, as discussed above.

Similar to the amplifier 1193 of the photocurrent-to-voltage converter 1104 of FIG. 11, the amplifier 1293 can be employed to increase the response speed of a change of the voltage $V_A$ generated at the output of the photocurrent-to-voltage converters 1204 between the source and the gate of the transistor 1191. In other words, the amplifier 1293 can be employed in low-latency applications to increase the speed with which a difference circuit (e.g., the difference circuit 206 of FIG. 2, the difference circuit 606 of FIG. 6, or another difference circuit of the present technology) of the corresponding event driven pixel produces the difference signal based on the voltage $V_B$ at node D (FIG. 2). Additionally, or alternatively, the amplifier 1293 can be configured to receive the enable signal EN<i> consistent with the discussion of the amplifier 1193 of the photocurrent-to-voltage converter 1104 of FIG. 11 above, to selectively enable or disable the amplifier 1293 (e.g., to reduce power consumption of the photocurrent-to-voltage converter 1204 and therefore of the corresponding event driven pixel).

C. CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An event driven pixel, comprising:
a photosensor configured to generate photocurrent in response to incident light received from an external scene;
a photocurrent-to-voltage converter coupled to the photosensor to convert the photocurrent to a first voltage; and
a difference circuit AC-coupled to the photocurrent-to-voltage converter,
wherein the difference circuit includes a source follower transistor and a switched-capacitor filter having an input coupled to the photocurrent-to-voltage converter and an output coupled to a gate of the source follower transistor,
wherein the switched-capacitor filter includes (a) a first capacitor coupled between the input and the output of the switched-capacitor filter, (b) a second capacitor having a first plate coupled to the output of the switched-capacitor filter, and (c) a reset transistor coupled between a reference voltage and the output of the switched-capacitor filter, and
wherein the difference circuit is configured to sample a reference light level based at least in part on the reference voltage and the first voltage at a first time, and to generate a difference signal based at least in part on a second voltage at the gate of the source follower transistor, wherein the second voltage is based at least in part on the reference light level and the first voltage at a second time, and wherein the difference signal is indicative of whether the event driven pixel has detected an event in the external scene.

2. The event driven pixel of claim 1, wherein a second plate of the second capacitor is coupled to ground.

3. The event driven pixel of claim 1, further comprising a varactor coupled to a second plate of the second capacitor.

4. The event driven pixel of claim 3, wherein the varactor includes:
a first transistor having a gate configured to receive a sample and hold signal, wherein the first transistor is coupled between (i) a second reference voltage and (ii) the second plate of the second capacitor; and
a second transistor having a gate configured to receive a boost signal, wherein the second transistor is coupled between (i) a third reference voltage and (ii) the second plate of the second capacitor.

5. The event driven pixel of claim 1, wherein:
the reset transistor includes a gate configured to receive a reset signal; and
the difference circuit is configured to sample the reference light level in response to assertion of the reset signal applied to the gate of the reset transistor.

6. The event driven pixel of claim 5, further comprising a reset control circuit having an output coupled to the gate of the reset transistor, wherein the reset control circuit is configured to:
   initialize the difference circuit in response to assertion of a global reset signal applied to the reset control circuit; and
   reset the difference circuit in response to a combination of (a) assertion of a row select signal applied to the reset control circuit and (b) assertion of an acknowledge signal applied to the reset control circuit when the difference signal indicates that the event driven pixel has detected the event in the external scene.

7. The event driven pixel of claim 6, wherein the reset control circuit includes:
   an AND logic gate having a first input configured to receive the row select signal, and a second input configured to receive the acknowledge signal; and
   an OR logic gate having a first input coupled to an output of the AND logic gate, a second input configured to receive the global reset signal, and an output coupled to an output of the reset control circuit.

8. The event driven pixel of claim 6, wherein the reset control circuit includes:
   a NAND logic gate having a first input configured to receive the row select signal, and a second input configured to receive the acknowledge signal;
   at least one pass transistor coupled to an output of the NAND logic gate and configured to receive the global reset signal; and
   a low-active switch configured to couple a supply voltage to an output of the reset control circuit based at least in part on the output of the NAND logic gate, an output of the at least one pass transistor, or a combination thereof.

9. The event driven pixel of claim 1, wherein:
   the difference circuit further includes a row select transistor coupled between the source follower transistor and a column line, and configured to receive a row select signal at a gate of the row select transistor; and
   the event driven pixel is configured to output the difference signal in response to assertion of the row select signal.

10. The event driven pixel of claim 1, wherein:
    the photocurrent-to-voltage converter includes a transistor having a drain coupled to a supply voltage, a source coupled to the photosensor, and a gate coupled to a first bias potential; and
    the photocurrent-to-voltage converter generates the first voltage between the source of the transistor and the photosensor.

11. The event driven pixel of claim 10, wherein:
    the photocurrent-to-voltage converter further includes a plurality of second transistors arranged in series between the photosensor and the source of the transistor;
    each of the second transistors has a gate coupled to a corresponding bias potential; and
    the photocurrent-to-voltage converter generates the first voltage between the source of the first transistor and an end of the series of the plurality of second transistors opposite the photosensor.

12. The event driven pixel of claim 1, wherein:
    the photocurrent-to-voltage converter includes:
      a transistor having a source coupled to the photosensor, and a drain coupled to a supply voltage, and
      an amplifier having an input coupled to the photosensor and to the source of the transistor, and an output coupled to a gate of the transistor; and
    the photocurrent-to-voltage converter generates the first voltage at the output of the amplifier.

13. The event driven pixel of claim 12, wherein the amplifier is configured to receive an enable signal to selectively enable the amplifier.

14. The event driven pixel of claim 12, wherein:
    the photocurrent-to-voltage converter further includes a plurality of second transistors arranged in series between (a) the photosensor and the input of the amplifier and (b) the source of the transistor; and
    each of the second transistors has a gate coupled to a corresponding bias potential.

15. A method of operating an event driven pixel, the method comprising:
    photogenerating photocurrent with a photosensor in response to receiving incident light from an external scene;
    converting the photocurrent to a first voltage;
    generating a difference signal, wherein generating the difference signal includes:
      sampling, using a capacitive voltage divider of a difference circuit of the event driven pixel and based at least in part on the first voltage at a first time, a reference light level, and
      generating, using the capacitive voltage divider, a second voltage at a gate of a source follower transistor of the difference circuit, wherein the second voltage is based at least in part on (i) the first voltage at a second time and (ii) the reference light level, wherein the difference signal is based at least in part on the second voltage, and wherein a magnitude of the difference signal is indicative of whether the event driven pixel has detected an event in the external scene; and
    outputting the difference signal onto a column line in response to assertion of a row select signal.

16. The method of claim 15, wherein sampling the reference light level includes asserting a reset signal applied to the difference circuit such that a voltage at the gate of the source follower transistor is set to a reference voltage.

17. The method of claim 16, wherein asserting the reset signal includes asserting the reset signal in response to assertion of a global reset signal applied to the event driven pixel to initialize the event driven pixel.

18. The method of claim 16, wherein asserting the reset signal includes asserting the reset signal in response to the assertion of the row select signal in combination with assertion of an acknowledge signal that is applied to the event driven pixel, and wherein the assertion of the acknowledge signal is dependent upon the magnitude of the difference signal exceeding a threshold.

19. The method of claim 15, wherein:
    the capacitive voltage divider includes a capacitor coupled between the gate of the source follower transistor and a varactor of the event driven pixel; and
    sampling the reference light level includes biasing a bottom plate of the capacitor to a low reference potential based at least in part on assertion of a sample and hold signal S&H applied to the varactor.

20. The method of claim 15, wherein:
    the capacitive voltage divider includes a capacitor coupled between a gate of the source follower transistor and a varactor of the event driven pixel; and generating the second voltage includes biasing a bottom plate of the capacitor to a low reference potential based at least in part on assertion of a sample and hold signal S&H applied to the varactor.

21. The method of claim 15, wherein:
the capacitive voltage divider includes a capacitor coupled between a gate of the source follower transistor and a varactor of the event driven pixel; and
outputting the difference signal includes amplifying the second voltage based at least in part on assertion of a boost signal applied to the varactor, wherein amplifying the second voltage includes decreasing a capacitance of the capacitor.

22. The method of claim 15, further comprising:
asserting an acknowledge signal when the magnitude of the difference signal exceeds a threshold; and
resetting the difference circuit in response to an overlap of (a) the assertion of the row select signal and (b) the assertion of the acknowledge signal.

23. The method of claim 22, wherein resetting the difference circuit includes:
asserting a reset signal applied to the difference circuit such that a voltage at the gate of the source follower transistor is set to a reference voltage; and
sampling a new reference light level based at least in part on the assertion of the reset signal.

24. The method of claim 18, further comprising:
comparing the magnitude of the difference signal to a threshold; and
preventing a reset of the difference circuit when (a) the row select signal is asserted, (b) a global reset signal is not asserted, and (c) the magnitude of the difference signal does not exceed the threshold.

25. The method of claim 15, wherein converting the photocurrent to the first voltage includes converting the photocurrent to the first voltage using a photocurrent-to-voltage converter of the event driven pixel, and wherein the method further comprises selectively disabling an amplifier of the photocurrent-to-voltage converter while photogenerating the photocurrent.

26. An imaging system, comprising:
event driven pixel including:
a photodetector configured to generate photocurrent in response to incident light received from an external scene,
a photocurrent-to-voltage converter coupled to the photodetector to convert the photocurrent to a voltage, and
a difference circuit coupled to the photocurrent-to-voltage converter and configured to generate a difference signal based at least in part on the voltage, wherein the difference circuit includes:
a capacitive voltage divider having (a) a first capacitor coupled to an output of the photocurrent-to-voltage converter and (b) a second capacitor coupled to the first capacitor opposite the output of the photocurrent-to-voltage converter;
a source follower transistor having a gate coupled to a node positioned between the first capacitor and the second capacitor;
a reset transistor coupled between a reference voltage and the node, and having a gate configured to receive a reset signal; and
a row select transistor coupled between the source follower transistor and a column line, and configured to output the difference signal onto the column line in response to assertion of a row select signal;
a threshold comparison circuit coupled to the difference circuit via the column line, wherein the threshold comparison circuit is configured to compare the difference signal to one or more thresholds; and
a control circuit coupled to the threshold comparison circuit and to the event driven pixel, wherein the control circuit is configured, when the difference signal exceeds a threshold of the one or more thresholds, to (i) register that the event driven pixel has detected an event in the external scene and (ii) initiate a reset of the difference circuit such that the node is set to the reference voltage.

27. The imaging system of claim 26, wherein the threshold comparison circuit includes:
a first comparator having an input coupled to the column line and configured to compare the difference signal to a first threshold of the one or more thresholds; and
a second comparator having an input coupled to the column line and configured to compare the difference signal to a second threshold of the one or more thresholds.

28. The imaging system of claim 26, wherein the event driven pixel further includes a varactor coupled to the second capacitor opposite the first capacitor.

29. The imaging system of claim 28, wherein the varactor includes:
a first transistor coupled between the second capacitor and a second reference voltage, and having a gate configured to receive a sample and hold signal; and
a second transistor coupled between the second capacitor and a third reference voltage, and having a gate configured to receive a boost signal.

30. The imaging system of claim 26, wherein:
the event driven pixel further includes a reset control circuit having a first input configured to receive a global reset signal from the control circuit, a second input configured to receive the row select signal, a third input configured to receive an acknowledge signal, and an output coupled to the gate of the reset transistor;
the control circuit is configured to assert the acknowledge signal to initiate the reset of the difference circuit when the difference signal exceeds the threshold; and
the reset control circuit is configured to assert the reset signal in response to:
assertion of the global reset signal,
assertion of the acknowledge signal while the row select signal is asserted, or
a combination thereof.

* * * * *